(12) United States Patent
Venkatesan et al.

(10) Patent No.: US 10,474,607 B2
(45) Date of Patent: Nov. 12, 2019

(54) ADAPT LINK TRAINING BASED ON SOURCE CAPABILITY INFORMATION

(71) Applicant: Intel Corporation, Santa Clara, CA (US)

(72) Inventors: Sriram Venkatesan, Folsom, CA (US); Sanjib Sarkar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/968,627

(22) Filed: May 1, 2018

(65) Prior Publication Data
US 2019/0042507 A1    Feb. 7, 2019

(51) Int. Cl.
G06F 13/40   (2006.01)
H04L 25/03   (2006.01)

(52) U.S. Cl.
CPC .... *G06F 13/4004* (2013.01); *H04L 25/03006* (2013.01)

(58) Field of Classification Search
CPC ............. G06F 13/4086; G06F 13/1689; G06F 13/4072; G06F 13/4004; G11C 16/32; H04L 25/03878; H04L 25/0272; H04L 25/03006
See application file for complete search history.

(56) References Cited

U.S. PATENT DOCUMENTS

| 7,853,731 | B1 | 12/2010 | Zeng |
| 9,645,959 | B2 * | 5/2017 | Achlaug ............... G06F 13/385 |
| 2014/0281068 | A1 * | 9/2014 | Das Sharma ....... G06F 13/4282 710/104 |
| 2015/0092065 | A1 * | 4/2015 | Radhakrishnan ........................... H04N 21/43632 348/180 |
| 2019/0028236 | A1 * | 1/2019 | Tonietto .............. H04L 43/0823 |

* cited by examiner

*Primary Examiner* — Vineeta S Panwalkar
(74) *Attorney, Agent, or Firm* — Lowenstein Sandler LLP

(57) ABSTRACT

A source device includes an adaptive link training circuity. The link training circuitry includes source capability information for link training of a link between the source device and a sink device. The source device includes a transmitter coupled to the adaptive link training circuitry to transmit the source capability information to the sink device. The adaptive link training circuitry is to initiate link training between the source device and the sink device, determine whether the link training between the source device and the sink device is unsuccessful, and in response to determining that the link training is unsuccessful, automatically adapt a setting of the link training based on the source capability information.

17 Claims, 9 Drawing Sheets

*400*

```
transmit source capability information of a source device to a sink device
410
```

↓

```
initiate link training between the source device and the sink device
420
```

↓

```
determine whether link training between the source device and the sink
device is unsuccessful
430
```

↓

```
in response to determining that the link training is unsuccessful,
automatically adapt a setting of the link training based on the source
capability information
440 automatically adapt a first lane of the link to a first setting, and
 automatically adapt a second lane of the link to a second setting, wherein
         the first setting is different than the second setting
                              442
```

FIG. 4

ADAPT LINK TRAINING BASED ON SOURCE CAPABILITY INFORMATION

BRIEF DESCRIPTION OF THE DRAWINGS

FIG. 4 is a flow chart of a method for adapting link training based on source capability information according to one embodiment.

DESCRIPTION OF EMBODIMENTS

Figure 1:
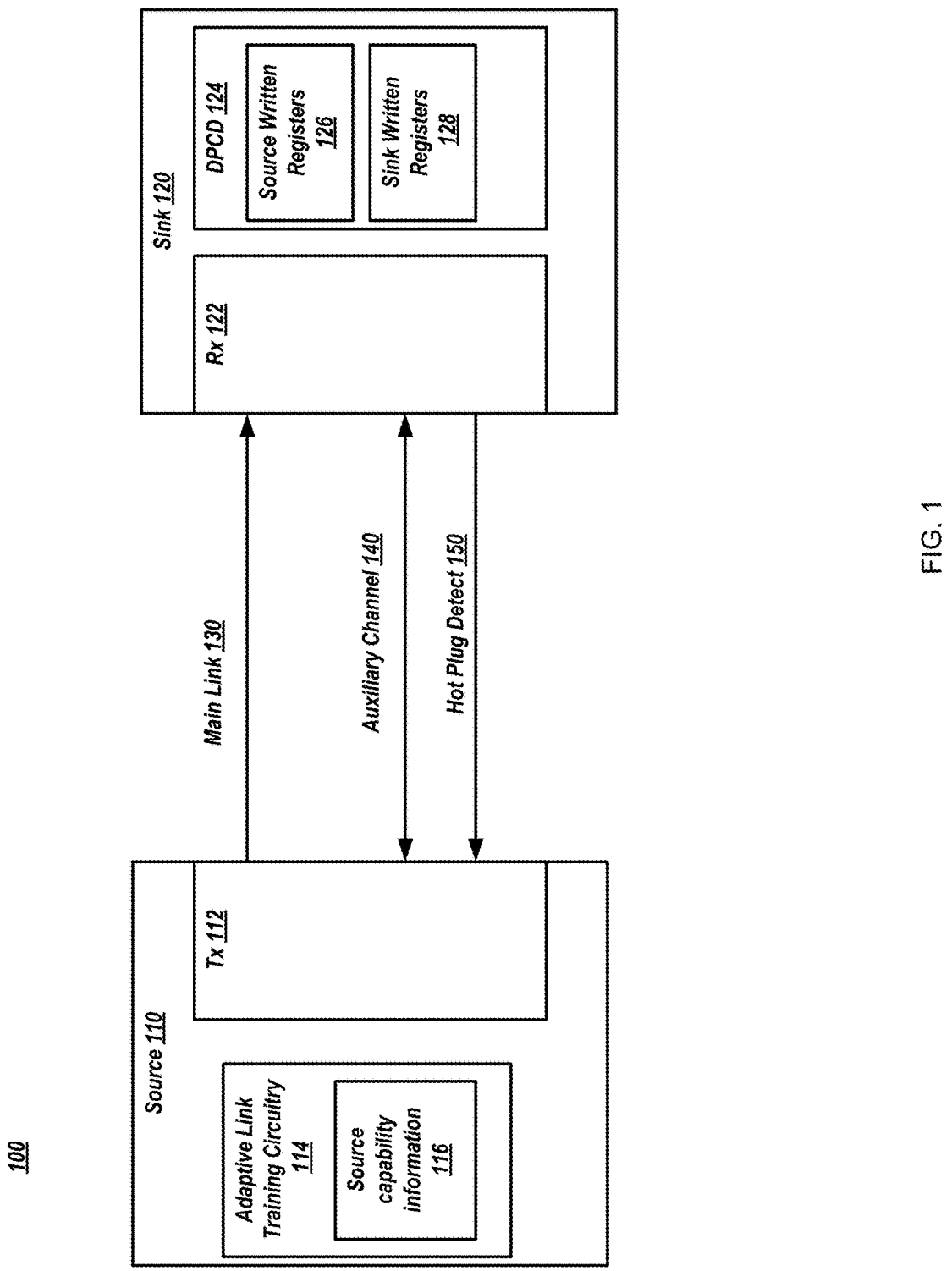
FIG. 1 is a block diagram of a system including source device and sink device coupled for link training according to an embodiment.

Display technology is pushing physical layer (PHY) requirements to meet higher frequencies. Additionally, the speed of display related links (e.g., embedded DisplayPort (eDP) and DP) are also increasing with each new generation. DP is a digital display interface developed by a consortium of personal computer and chip manufacturers and standardized by the Video Electronics Standards Association (VESA). In general, the VESA DP standard defines a flexible system and apparatus capable of transporting video, audio and other data between a source device and a sink device over a digital communications interface.

Typically, when a source device (e.g., video source device) is coupled to a sink device (e.g., display device), link training takes place to ensure that a proper and successful connection is made between the source device and the sink device. In general, link training is a process by which the transmitter (source) and receiver (sink) communicate with each other in order to tune their equalization settings over the link. Link training is what allows devices to optimize their equalization to the connected channel before network traffic starts to flow. With the increased requirement for bandwidth over the PHY, the link training procedure becomes more important to enable good signal integrity for the high speed video signals.

Link training can be very arduous and complex based on various factors. For, example, the source device does know in advance what the channel (or link) characteristics will be. Also, there may be thousands of different combinations of sink/source devices. As such, the link training is unique for each combination of source/sink. The link training can be even more challenging based on the characteristics of the source/sink system. For example, use of retimers, redrivers (active/passive), protocol converters (e.g., DP to High-Definition Multimedia Interface (HDMI)) in the system architecture increases the complexity of the link training.

High link speeds (e.g., >8 Gbps) in complex system architectures oftentimes need highly optimized transmitter equalizations. The equalizations for such architectures may take into account control panel receiver device material skew, source transmitter device material skew, packages in the receiving and transmitting sides, mother-board channels, and the like. The optimized transmitter equalizations in such complex architectures need the appropriate range and step-size granularity in equalization coefficients. The problem of accomplishing optimal link equalization extends to Link Trainable Tunable PHY Repeater (LTTPR), such as DP-IN links, where a source/sink connection could include up to eight links. DP-IN is a link to route graphics display traffic from a graphics device through CPU and its I/O port (e.g., USB TypeC port to a display device). This DP-IN topology saves an external discrete mux device to mux display data traffic from CPU and a graphics card/device in a PC system.

Current eDP and DP standards do not provide the appropriate range and step-size granularity in equalization coefficients for high link speeds (e.g., >8 Gbps). The current eDP/DP standard allows few discrete steps and too large of granularity. In particular, the current eDP/DP standard supports nine preset values which are predefined by the specification. The preset values are used in the channel equalization technique for the link training. The preset values are not sufficient to guarantee a robust functional link between the source/sink because the step size of the preset values is too large to obtain an optimal equalization. Also, the current eDP/DP standard does not allow for an automated handshake between the interacting devices that would converge the desired optimization to the transmitter equalization.

A common work around for the deficiencies describe above is providing link training software to the customer. The customer then manually tunes the link for each of their platforms via the provided software. This can be an arduous task for the customer. Also, customer service may need to get involved to help the customer tune the link for each of the platforms which adds additional time and cost to the process of link training.

Various embodiments described herein will provide solutions to the deficiencies described above. For example, various embodiments described herein are directed to, but not limited to, (1) adaptive equalization of a channel in a coefficient space, (2) communicating direction of the equalization change, and (3) avoiding the current work-around of providing software to each customer such that the customer can provide their own source tuning. For example, the sink device can indicate whether the equalization co-efficient has to increment or decrement by indicating through the bits in DPCD registers and can be read through auxiliary I/O path.

FIG. 1 depicts system 100 that includes source 110 coupled to sink 120. In one embodiment, source 110 is a DP source and sink 120 is a DP sink where the coupling of the sink and source based on the DP standard described herein. However, it should be appreciated that system 100 is based on other communication standards other than the DP standard.

Source 110 includes transmitter 112 to transmit data to sink 120. Source 110 includes adaptive link training circuitry (ALTC) 114 that is coupled to transmitter 112. ALTC 114 includes source capability information 116. As will be described in further detail below, source capability information 116 includes various source information directed to the equalization of the source during link training. Source 110 can be any device that provides audio/video data to sink 120.

For example, source 110 can be, but is not limited to, a graphics processing unit (GPU), system-on-chip (SOC), etc.

Sink 120 includes receiver 122 coupled to DisplayPort Configuration Data (DPCD) 124. In various embodiments, DPCD 124 is mapped to the DP address space of the sink device. In one example, source 110 reads the receiver capability and status of the DP link and the sink from DPCD addresses. In addition, source 110 writes to the link configuration field of the DPCD to configure and initialize the link. Also, in one embodiment, sink 120 writes link training data to DPCD 124. For example, sink 120 writes sink written registers 128 to DPCD 124. It should be appreciated that in the DP standard, the DPCD 124 register map is used for the link training sequence during the clock recovery and channel equalization process.

Source 110 and sink 120 are coupled together in a master/slave relationship, where source 110 is the master and sink 120 is the slave. Source 110 and sink 120 are coupled together via main link 130, auxiliary channel 140 and hot plug detect 150. It should be appreciated that source 110 and sink 120 may be coupled together via various coupling means. For example, source 110 and sink 120 are coupled together via a Universal Serial Bus (USB) cable and corresponding USB-type C connector. This example can be referred to as an open, box-to-box connection. Alternatively, source 110 and sink 120 may be connected via a closed (or embedded), box-to-box connection. Typically, in a closed, box-to-box connection, the source and the sink are designed to work together and are part of a single computing device (e.g., a laptop, where the source (graphics processor) and sink (display) are both disposed within the laptop).

Main link 130 (also referred to as the data channel) is the primary data link between source 110 and sink 120. In various embodiments, the main link is a uni-directional, high-bandwidth and low-latency channel used to transport isochronous data streams such as uncompressed video and audio. Main link 130 handles the audio/video data from source 110 to sink 120.

In various embodiments, main link 130 includes one or more parallel data lanes. In one embodiment, the main link includes one, two or four ac-coupled, doubly terminated differential pairs (referred to as lanes). AC-coupling facilitates the silicon process migration since the DP transmitter (e.g., transmitter 112) and receiver (e.g., receiver 122) may have different common mode voltages.

It should be appreciated that the source and sink devices are allowed to support the minimum number of lanes required for their needs. For example, the devices that support two lanes are required to support both one and two lanes, while those that support four lanes are required to support one, two and four lanes. In various embodiments, an external cable that is detachable by an end user is required to support four lanes to maximize the interoperability between source and sink devices.

Auxiliary channel 140 (also referred to as the AUX channel) is a half-duplex bi-directional channel used for link management and device control. The auxiliary channel is a separate communication channel between the source and the sink. The auxiliary channel is mainly used during the link training procedure, before communication over the main link has been established.

Hot plug detect 150 is used by both the source and the sink to detect when two devices has been connected together. In response to detection of a connection between the source and the sink via hot plug detect 150, link training is initialized.

In one embodiment, source capability information 116 is transmitted from source 110 to receiver 122 of sink 120 over auxiliary channel 140. Once received at sink 120, source capability information 116 is then stored in DPCD 124. In particular, source capability information 116 is stored as source written registers 126 in DPCD 124.

As described above, source capability information 116 includes various source information directed to the equalization of the source during link training. In various embodiments, source capability information 116 includes, but is not limited to, voltage swing range and corresponding step size (referenced as LANEx Vswing Stepsize in a register of DPCD 124), and equalization step size (referenced as LANEx EQ Stepsize in a register of DPCD 124). LANEx Vswing Stepsize can indicate the range of the voltage swing of the lanes in main link 130 (e.g., 400 mV and 1200 mV (peak-to-peak) and the granularity of the step size of the voltage swing (e.g., 50 mV step size—50 mV set as 1, 100 mV set as 2, . . . ). The voltage swing is the amplitude of the electrical signal.

LANEx EQ Stepsize provides the pre-emphasis step size in terms of decibel (db) resolution (e.g., 0.1 db step size—0.1 db set as 1, 0.2 db set as 2, . . . ). The pre-emphasis parameter adds an overshoot to the signal as it leaves the transmitter. This overshoot is added to the signal to compensate for signal attenuation in the medium. It should be appreciate that source capability information 116 can also include information associated with taps (e.g., 2 tap/3 tap), pre-cursor (e.g., 1 precursor), cursor (e.g., 1 cursor), and post-cursor (1 post-cursor).

It should be appreciated that registers LANEx EQ Stepsize and LANEx Vswing Stepsize in DPCD 124 are not in the current DP standard. As such, they are considered new registers in DPCD 124. During link training, registers LANEx EQ Stepsize and LANEx Vswing Stepsize are read by source 110 to adjust the voltage swing and equalization, respectively. The implementation of registers LANEx EQ Stepsize and LANEx Vswing Stepsize extends the range and step size of the voltage swing and the step size of the equalization (beyond the current DP standard) to achieve a successful and optimal link for different platforms.

As described above, sink 120 writes sink written registers 128 to DPCD 124. Sink written registers 128 indicate the direction of the link training during the clock recovery and channel equalization. Sink written registers 128 can include, but are not limited to, LANEx Cursor Decrement/Increment (used to decrement/increment the transition swing), LANEx Pre Cursor Decrement/Increment (used to decrement/increment the pre-emphasis), and LANEx Pre Cursor2 Decrement/Increment (used to decrement/increment the pre-emphasis2).

Figure 2:
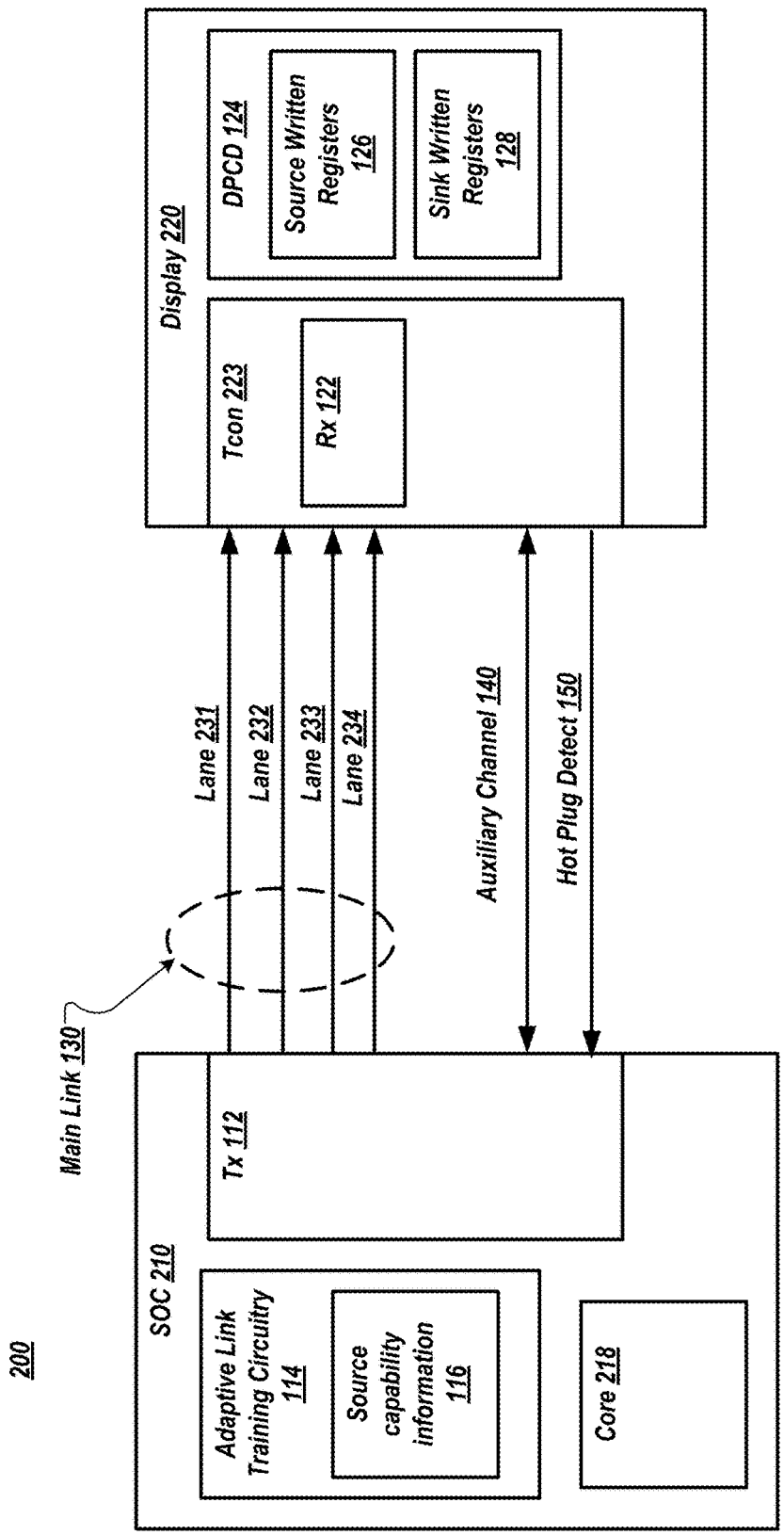
FIG. 2 is a block diagram of a system including a SOC and display device coupled for link training according to an embodiment.

FIG. 2 depicts system 200 that includes SOC 210 (source) coupled to display 220 (sink). System 200 is similar to system 100. As such, system 200 includes similar capabilities and functionality as system 100. However, system 200 includes, among other things, core 218 and timing controller (Tcon) 223. SOC 210, in one embodiment, is a GPU. Core 218 can be, but is not limited to, a graphics core or processing core.

Display 220, in various embodiments, can be one of many different types of displays (e.g., liquid-crystal display (LCD) display). Tcon 223, in various embodiments, is coupled to receiver 122 and DPCD 124.

As shown in FIG. 2, main link 130 includes four independent lanes (e.g., lane 231, lane 232, lane 233 and lane 234). It should be appreciated that main link 130 can include any number of lanes (e.g., more or less than four lanes). As will be described in further detail below, link training can be provided to each lane independently. In contrast, in convention systems, the same link training setting is provided across the entire link (to each lane(s) in the link).

Figure 3:
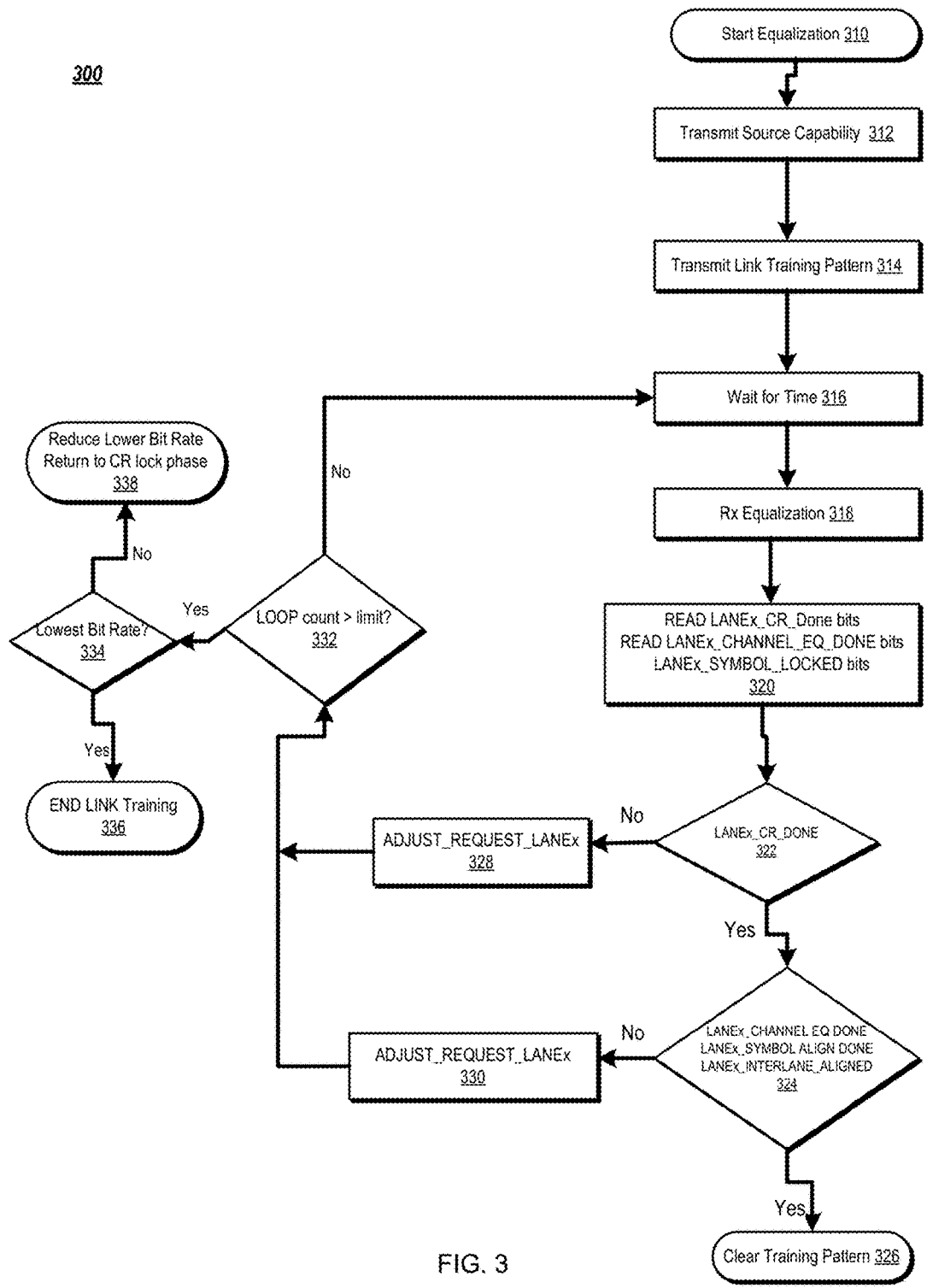
FIG. 3 is a flow chart of a method for adapting link training based on source capability information according to one embodiment.

FIG. 3 is a flow chart of a method 300 for adapting link training based on source capability information according to one embodiment. At step 310, equalization is initiated. In one embodiment, link training includes the process of clock recovery and channel equalization.

At 312, source capability is transmitted to the sink device. For example, transmitter 112 of SOC 210 transmits source capability information 116 over auxiliary channel 140 to receiver 122 of display 220. The source capability information is then stored in DPCD 124.

At 314, a training pattern is transmitted from the source to the sink over the main link. For example, ALTC 114 includes a training pattern. The training pattern is transmitted from SOC 210 to display 220 over main link 130. In one embodiment, the initial training pattern is predetermined based on the DP standard (e.g., 400 mV+0 dB for lowest power). Alternatively, the initial training pattern may not be predetermined.

At 316, the equalization process waits for duration of time to apply the new source settings. Typically depending on the design of transmitting device, changes in swing and equalization levels may take some time, as the transmit devices will read what is requested and apply to its circuitry.

At 318, receiver equalization occurs. For example, display 220 uses eye height and/or eye width monitor during the equalization. Additionally, display 220 may request a change from the current swing and equalization. It is noted that the swing means the peak amplitude of transmitted signal without any equalization and the equalization means the modulation of the peak amplitude to counter channel inter-symbol-interference effects. Display 220 may have particular preference to the swing and equalization levels for optimum power and/or robust electrical margins.

At 320, the sink device sets bits corresponding to READ LANEx_CR_Done, READ LANEx_CHANNEL_EQ_DONE, and LANEx_SYMBOL_LOCKED. The bits are written in the DPCD 124. The sink device will choose to update the registers when clock-recovery-lock is accomplished, optimal equalization is completed, symbol-lock is accomplished.

At 322, the status of the clock recovery sequence is read to determine if the clock-recovery lock has been achieved. If the status of the clock-recovery lock has been achieved then the equalization process moves to 324. If the status of the clock-recovery lock has not been achieved, then the equalization process moves to 328.

At 328, the sink requests an adjustment in the equalization settings (ADJUST_REQUEST_LANEx). For example, the sink requests one of more of LANEx Cursor Decrement/Increment (used to decrement/increment the transition swing), LANEx Pre Cursor Decrement/Increment (used to decrement/increment the pre-emphasis), and LANEx Pre Cursor2 Decrement/Increment.

Further, at 328, (if the status of the clock-recovery lock has not been achieved at 322) the link training is automatically adapted (or adjusted). This adjustment is based, at least in part, on the source capability information 116 that is stored in DPCD 124, as described above. For example, the LANEx Vswing Stepsize register indicates that the step size of the voltage swing includes a 50 mV step size. As such, if the current voltage swing of the link training is 400 mV (and the link training was unsuccessful), then, in one embodiment, the voltage swing is automatically adjusted to increment to 450 mV, at 328. Similarly, if the adjusted voltage swing is 450 mV (and the link training is unsuccessful once again), then, in one embodiment, the voltage swing is automatically adjusted to increment to 500 mV, and so on. Alternatively, in some embodiments, the voltage swing may be decremented by a step size (e.g., 50 mV step size).

It is noted that the link training is done on a per lane basis. That is, each lane is individually link trained. Accordingly, lanes in a link may include different link training settings. For example, lane 231 of main link 130 may have different ADJUST_REQUEST_LANEx settings for link training than lane 232 of main link 130. In contrast, in conventional link training standards, a link, as whole, is link trained such that each lane in the link is provided the same link training settings. Moreover, the link training, in the conventional link training standards is based on a fixed set of preset values.

At 332, if the loop count is less than the loop count limit (e.g., 5) then the equalization process loops to 316. If the loop count is greater than the limit, the equalization process moves to 334, which will be described in further detail below.

At 324, (if the status of the clock-recovery lock has been achieved) the source device reads the status of lane(s) which includes the bit lock, symbol lock and inter-lane alignment.

At 326, if the link training is successful, then link training is completed and the training pattern is cleared.

At 330, (if the link training is unsuccessful at 324), then the link training is automatically adapted (or adjusted), similar to 328. For example, the LANEx EQ Stepsize register indicates that the preemphasis step size is 0.1 db. As such, the premphasis is adjusted to increment by 0.1 db. Alternatively, in some embodiments, the preemphasis may be decremented by a step size (e.g., 0.1 db). At 330, is for a change in equalization level compared to 328 which is for a change in amplitude of the voltage swing level.

At 334, (if the loop count is greater than the limit at 332), it is determined if the bit rate during link training is at the lowest bit rate. If the bit rate is at the lowest bit rate, then the link training is ended, at 336. If the current bit rate is not at the lowest bit rate, then at 338, the bit rate is further reduced, and the link training return to a clock-recovery lock phase.

FIG. 4 is a flow diagram of a method 400 of automatically adapting link training, according to one embodiment. Method 400 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 400 may be performed, in part, by a layout and routing tool executing on a processing device. In some embodiments, a non-transitory storage medium stores instructions that when executed by a processing device cause the processing device to perform method 400.

Referring to FIG. 4, at block 410, source capability information of a source device is transmitted to a sink device. For example, source capability information 116 is transmitted from SOC 210 to display 220 and stored in DPCD 124.

At block 420, link training between the source device and the sink device is initiated. For example, adaptive link training circuitry 114 initiates link training between SOC 210 and display 220. In one embodiment, link training is initiated in response to a determination that SOC 210 is coupled to display 220 via hot plug detect 150.

At block 430, is determined whether link training between the source device and the sink device is unsuccessful. For example, referring to FIG. 3, at 322, the source device determines if the status of the clock-recovery lock has not been achieved. Alternatively, at 324, the source device reads the status of lane(s) which includes the bit lock, symbol lock and inter-lane alignment to determine if link training is successful.

At block 440, in response to determining that the link training is unsuccessful, a setting of the link training is automatically adapted based on the source capability information. For example, referring to FIG. 3, at 328 and 330, there is an adjustment in the link training settings (e.g., ADJUST_REQUEST_LANEx).

At block 442, in one embodiment, a first lane of the link is automatically adapted to a first setting, and a second lane of the link is automatically adapted to a second setting, wherein the first setting is different than the second setting. For example, during link training of lane 231, lane 231 is set to a voltage swing of 600 mV, and during link training of lane 234, lane 234 is set to a voltage swing of 1000 mV. Accordingly, lanes of main link 130 are independently link trained.

Figure 5:
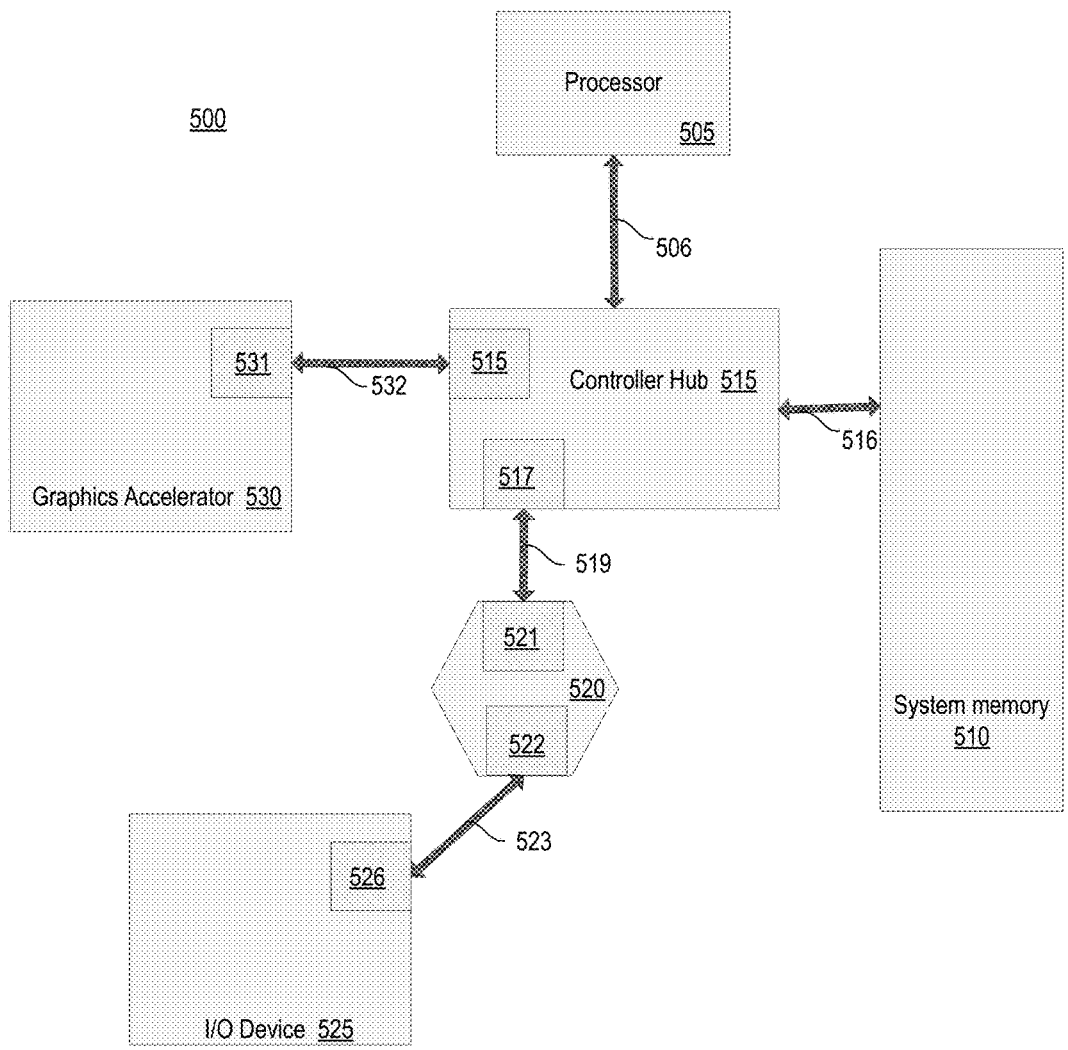
FIG. 5 is a block diagram of a computing system including an interconnect fabric architecture, according to an embodiment of the present disclosure.

FIG. 5 is a block diagram of a computing system including an interconnect fabric architecture, according to an embodiment of the present disclosure. Referring to FIG. 5, an embodiment of a fabric composed of point-to-point links that interconnect a set of components is illustrated. System 500 includes processor 505 and system memory 510 coupled to controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect as described below. In another embodiment, FSB 506 includes a serial, differential interconnect architecture that is compliant with different interconnect standards.

System memory 510 includes any memory device, such as random access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a PCIe® (or PCIE®) interconnection hierarchy, although can also exist within other point-to-point, serial, differential, layered protocol or interconnect fabric architectures by way of example. Examples of controller hub 515 include a chipset, a memory controller hub (MCH), a Northbridge, an interconnect controller hub (ICH) a Southbridge, and a root controller/hub. Often the term chipset refers to two physically separate controller hubs, i.e. a memory controller hub (MCH) coupled to an interconnect controller hub (ICH). Note that current systems often include the MCH integrated with processor 505, while controller hub 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which can also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e. up a hierarchy towards a root complex, to controller hub 515 and downstream, i.e. down a hierarchy away from a root controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a FireWire® device, a Universal Serial Bus (USB) device, a scanner, and other input/output devices. Often in the PCIe® vernacular, such a device is referred to as an endpoint. Although not specifically shown, device 525 can include a PCIe® to PCI/PCI-X bridge to support legacy or other version PCI™ devices. Endpoint devices in PCIe are often classified as legacy, PCIe®, or root complex integrated endpoints.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. Similar to the MCH discussion above, a graphics controller or the graphics accelerator 530 itself can be integrated in processor 505.

Figure 6:
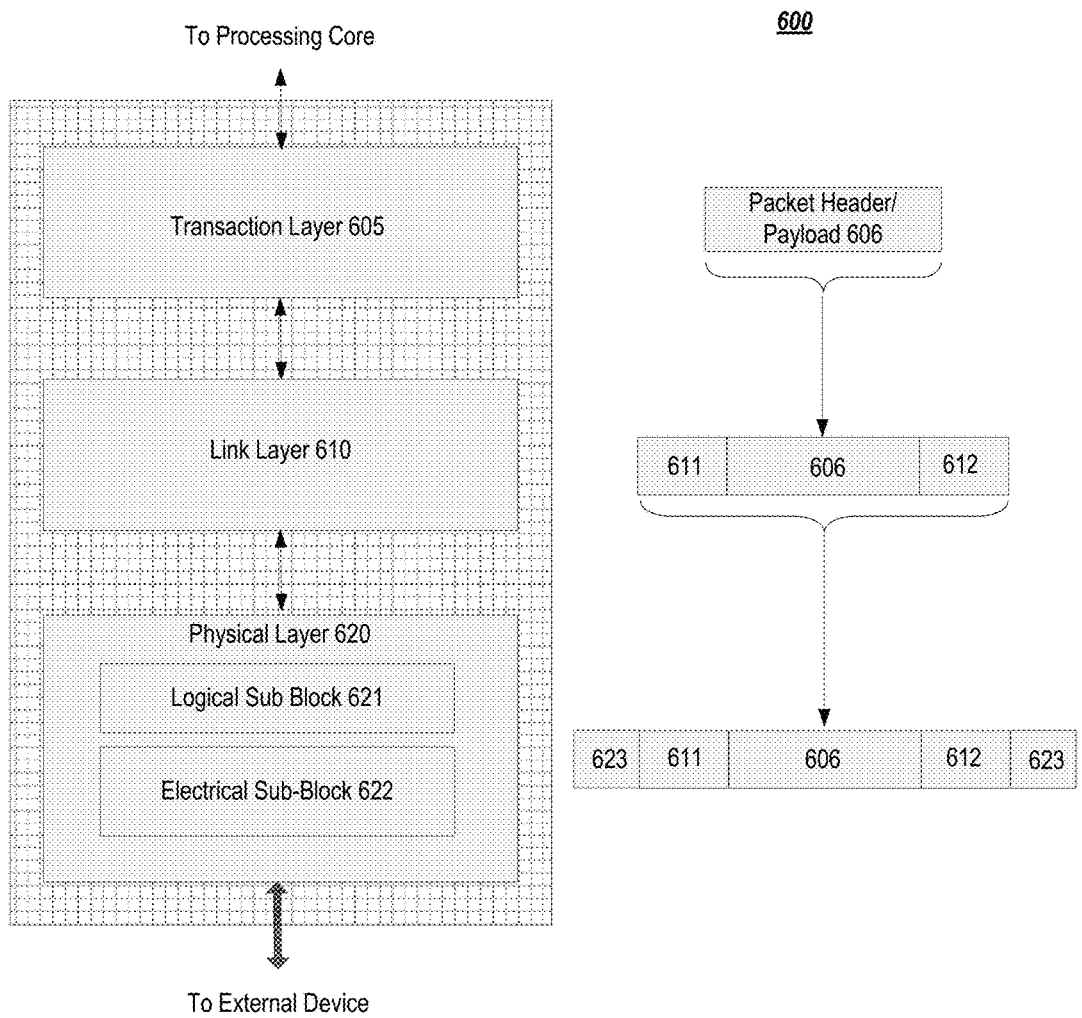
FIG. 6 is a block diagram of an interconnect fabric architecture including a layered stack, according to an embodiment of the present disclosure.
Figure 7:
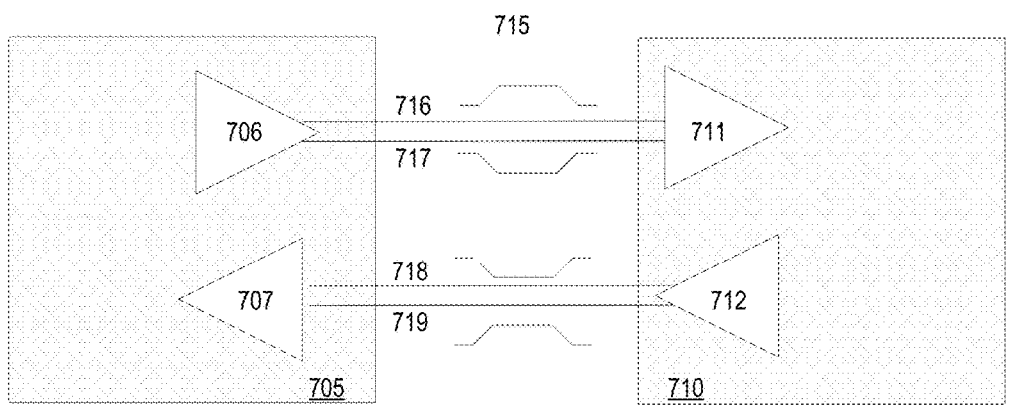
FIG. 7 is a block diagram of a transmitter and receiver pair usable within an interconnect fabric architecture or a serial point-to-point interconnect fabric, according to an embodiment of the present disclosure.

Turning to FIG. 6, an embodiment of a layered protocol stack is illustrated. Layered protocol stack 600 includes any form of a layered communication stack, such as a Quick Path Interconnect (QPI) stack, a PCIe® stack, a next generation high performance computing interconnect stack, or other layered stack. Although the discussion immediately below in reference to FIGS. 5-7 are in relation to a PCIe® stack, the same concepts can be applied to other interconnect stacks. In one embodiment, protocol stack 600 is a PCIe protocol stack including transaction layer 605, link layer 610, and physical layer 620. An interface, such as interfaces 517, 518, 521, 522, 526, and 531 in FIG. 5, can be represented as communication protocol stack 600. Representation as a communication protocol stack can also be referred to as a module or interface implementing/including a protocol stack.

In one embodiment, interfaces 517, 518 and 522 can be a source 111 (or SOC 210) and include ALTC 114, which are discussed with reference to FIGS. 1-4. Similarly, interfaces 521, 531 and 526 can be a sink 120 (or display 22) and a receiver 122 and DPCD 124, which are also discussed with reference to FIGS. 1-4. Accordingly, source capability information or a training pattern from one of interfaces 817, 818 or 822 can be transmitted to one of the interfaces 821, 831 or 826, respectively, according to a link training process as discussed herein.

PCI Express® uses packets to communicate information between components. Packets are formed in the transaction layer 605 and data link layer 610 to carry the information from the transmitting component to the receiving component. As the transmitted packets flow through the other layers, they are extended with additional information necessary to handle packets at those layers. At the receiving side the reverse process occurs and packets get transformed from their physical layer 620 representation to the data link layer 610 representation and finally (for transaction layer packets) to the form that can be processed by the transaction layer 605 of the receiving device.

Transaction Layer

In one embodiment, transaction layer 605 is to provide an interface between a device's processing core and the interconnect architecture, such as data link layer 610 and physical layer 620. In this regard, a primary responsibility of the transaction layer 605 is the assembly and disassembly of packets (e.g., transaction layer packets, or TLPs). The translation layer 605 typically manages credit-base flow control for TLPs. PCIe® implements split transactions, i.e. transactions with request and response separated by time, allowing a link to carry other traffic while the target device gathers data for the response.

In addition, PCIe® utilizes credit-based flow control. In this scheme, a device advertises an initial amount of credit for each of the receive buffers in transaction layer 605. An external device at the opposite end of the link, such as controller hub 515 in FIG. 5, counts the number of credits consumed by each TLP. A transaction can be transmitted if the transaction does not exceed a credit limit. Upon receiving a response, an amount of credit is restored. An advantage of a credit scheme is that the latency of credit return does not affect performance, provided that the credit limit is not encountered.

In one embodiment, four transaction address spaces include a configuration address space, a memory address space, an input/output (I/O) address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe® devices. Transactions to the configuration space include read requests and write requests. Message space transactions (or, simply messages) are defined to support in-band communication between PCIe® agents.

Therefore, in one embodiment, transaction layer 605 assembles packet header/payload 606. Format for current packet headers/payloads can be found in the PCIe® specification at the PCIe® specification website.

Link Layer

Link layer 610, also referred to as data link layer 610, acts as an intermediate stage between transaction layer 605 and the physical layer 620. In one embodiment, a responsibility of the data link layer 610 is providing a reliable mechanism for exchanging transaction layer packets (TLPs) between two components a link. One side of the data link layer 610 accepts TLPs assembled by the transaction layer 605, applies packet sequence identifier 611, i.e. an identification number or packet number, calculates and applies an error detection code, i.e. CRC 612, and submits the modified TLPs to the physical layer 620 for transmission across a physical to an external device.

Physical Layer

In one embodiment, physical layer 620 includes logical sub-block 621 and electrical sub-block 622 to physically transmit a packet to an external device. Here, logical sub-block 621 is responsible for the "digital" functions of physical layer 620. In this regard, the logical sub-block includes a transmit section to prepare outgoing information for transmission by electrical (e.g., physical) sub-block 622, and a receiver section to identify and prepare received information before passing it to the Link Layer 610.

In one embodiment, the electrical sub-block 622 includes a transmitter (e.g., transmitter 112) and/or a receiver (e.g., receiver 122). In this way, source capability information and a link training pattern may be transmitted from the physical later 620 of a transmitting device (e.g., source 110) to a physical layer 620 of a receiving device (e.g., sink 120), as described in FIGS. 1-4.

The transmitter can also, alternatively or additionally, be supplied by logical sub-block 621 with symbols, which the transmitter serializes and transmits onto to an external device. The receiver is supplied with serialized symbols from an external device and transforms the received signals into a bit-stream. The bit-stream is de-serialized and supplied to logical sub-block 621. In one embodiment, an 8b/10b transmission code is employed, where ten-bit symbols are transmitted/received. Here, special symbols can be used to frame a packet with frames 623. In addition, in one example, the receiver also provides a symbol clock recovered/reconstructed from the incoming serial stream.

As stated above, although transaction layer 605, link layer 610, and physical layer 620 are discussed in reference to a specific embodiment of a PCIe® protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

FIG. 7 is a block diagram of a transmitter and receiver pair 700 usable within an interconnect fabric architecture and within a serial point-to-point fabric, according to an embodiment of the present disclosure. Although an embodiment of a PCIe® serial point-to-point link is illustrated, a serial point-to-point link is not so limited, as it includes any transmission path for transmitting serial data. In the embodiment shown, a basic PCIe® link includes two, low-voltage, differentially driven signal pairs: a transmit pair 706/711 and a receive pair 712/707. Accordingly, device 705 includes transmission logic 706 to transmit data to device 710 and receiving logic 707 to receive data from device 710. In other words, two transmitting paths, i.e. paths 716 and 717, and two receiving paths, i.e. paths 718 and 719, are included in a PCIe® link.

In one embodiment, transmission logic 706 and 712 can each include a ALTC 114 such as displayed in and discussed with reference to FIGS. 1-2. Further, the receiving logic 711 and 707 can each include a DPCD 124 as displayed in and discussed with reference to FIGS. 1-2. In this way, the device 705 can transmit source capability information and link training to the device 710, as discussed with reference to FIGS. 1-4.

A transmission path refers to any path for transmitting data, such as a transmission line, a copper line, an optical line, a wireless communication channel, an infrared communication link, or other communication path. A connection between two devices, such as device 705 and device 710, is referred to as a link, such as link 715. A link may support one lane or more lanes—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In one embodiment, the transmission logic 706 or 712 can include or make up a part of ALTC 114. Similarly, the receiving logic 707 or 711 can include or make up a part of receiver 122 and/or DPCD 124.

A differential pair refers to two transmission paths, such as lines 716 and 717, to transmit differential signals. As an example, when line 716 toggles from a low voltage level to a high voltage level, i.e. a rising edge, line 717 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 8:
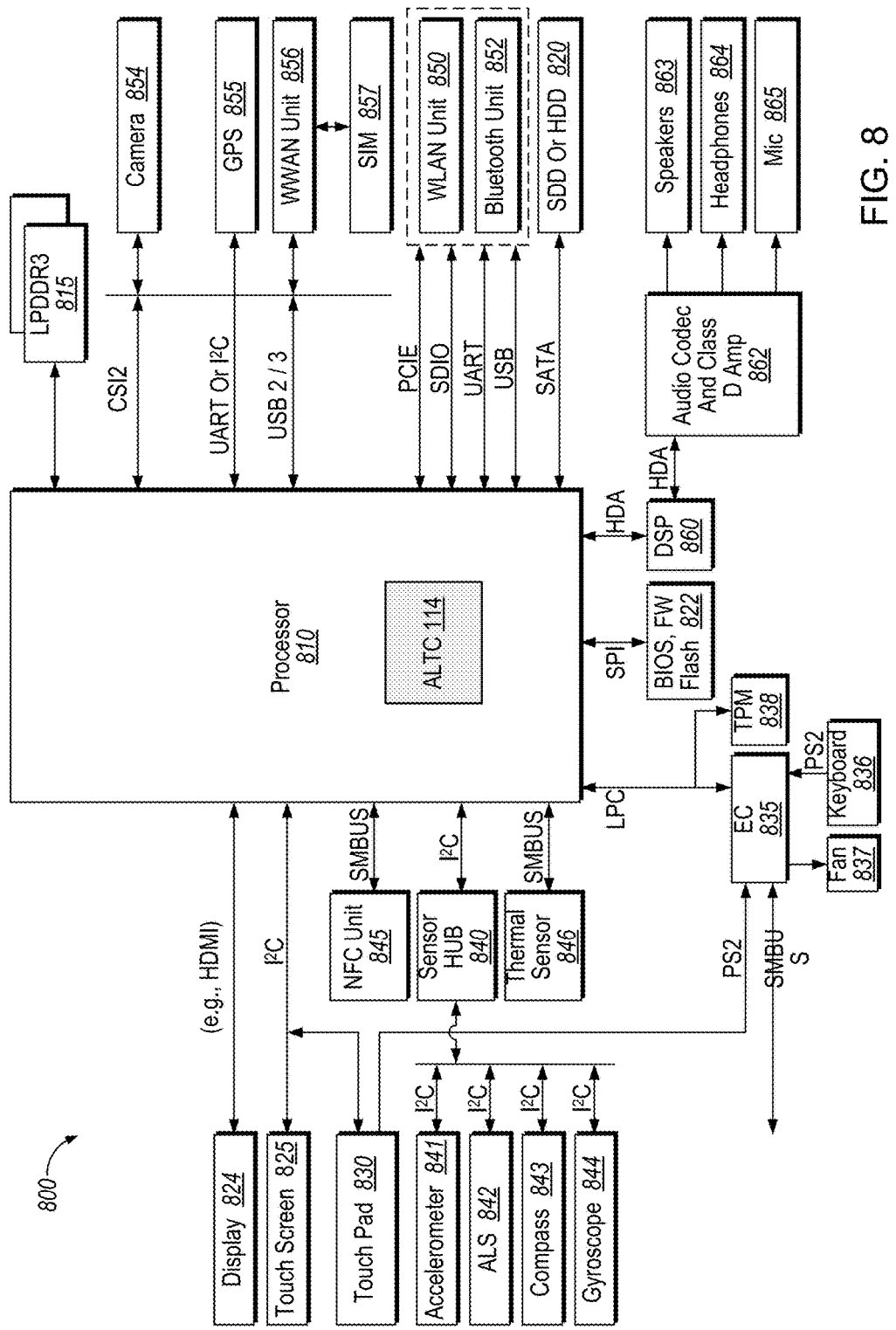
FIG. 8 is a block diagram of a computing system, according to an embodiment of the present disclosure.

Referring now to FIG. 8, a block diagram of components present in a computer system in accordance with an embodiment of the present disclosure is illustrated. As shown in FIG. 8, system 800 includes any combination of components. These components can be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown can be omitted, additional components can be present, and different arrangement of the components shown can occur in other implementations. As a result, the disclosure described above can be implemented in any portion of one or more of the interconnects illustrated or described below.

As seen in FIG. 8, a processor 810, in one embodiment, includes a microprocessor, multi-core processor, multi-threaded processor, an ultra-low voltage processor, an embedded processor, or other known processing element. In one embodiment, the processor 810 can include ALTC 114 and the various connected I/O and connected devices (discussed below) can include a receiver 122 and/or DPCD 124. In this way, the processor can act as a source 110 as discussed herein, and the various connected I/O and other connected devices can act as a sink 120.

In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters can instead be present in other embodiments such as an Apple A5/A6 processor, a Qualcomm Snapdragon processor, or TI OMAP processor. Note that many of the customer versions of such processors are modified and varied; however, they can support or recognize a specific instructions set that performs defined algorithms as set forth by the processor licensor. Here, the microarchitectural implementation can vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices can be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and can be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 can also couple to processor 810. In various embodiments, to enable a thinner and lighter system design as well as to improve system responsiveness, this mass storage can be implemented via a solid state drive (SSD). However in other embodiments, the mass storage can primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 can be coupled to processor 810, e.g., via a serial peripheral interface (SPI). This flash device can provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache can be configured as a single level cache (SLC) or multi-level cache (MLC) option to provide an appropriate level of responsiveness. In a SSD-only option, the module can be accommodated in various locations such as in a mSATA or NGFF slot. As an example, an SSD has a capacity ranging from 120 GB-1 TB.

Various input/output (I/O) devices can be present within system 800. Specifically shown in the embodiment of FIG. 8 is a display 824 which can be a high definition LCD or LED panel configured within a lid portion of the chassis. This display panel can also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 can be coupled to processor 810 via a display interconnect that can be implemented as a high performance graphics interconnect. Touch screen 825 can be coupled to processor 1110 via another interconnect, which in an embodiment can be an I²C interconnect. As further shown in FIG. 8, in addition to touch screen 825, user input by way of touch can also occur via a touch pad 830 which can be configured within the chassis and can also be coupled to the same I²C interconnect as touch screen 825.

For perceptual computing and other purposes, various sensors can be present within the system and can be coupled to processor 810 in different manners. Certain inertial and environmental sensors may couple to processor 810 through a sensor hub 840, e.g., via an I²C interconnect. In the embodiment shown in FIG. 8, these sensors can include an accelerometer 841, an ambient light sensor (ALS) 842, a compass 843 and a gyroscope 844. Other environmental sensors can include one or more thermal sensors 846 which in some embodiments couple to processor 810 via a system management bus (SMBus) bus.

Using the various inertial and environmental sensors present in a platform, many different use cases can be realized. These use cases enable advanced computing operations including perceptual computing and also allow for enhancements with regard to power management/battery life, security, and system responsiveness. For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it can be determined whether a user is allowed to access certain secure documents. For example, a user can be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations can include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing can be disabled. Furthermore, when pairing a platform as described herein and a smartphone, an alarm can be configured to be triggered when the devices move more than a predetermined distance from each other, when in a public location. In contrast, when these paired devices are in a safe location, e.g., a work place or home location, the devices can exceed this predetermined limit without triggering such alarm.

Responsiveness can also be enhanced using the sensor information. For example, even when a platform is in a low power state, the sensors can still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases can be enabled using sensor information obtained via the integrated sensors within a platform as described herein, and the above examples are only for purposes of illustration. Using a system as described herein, a perceptual computing system can allow for the addition of alternative input modalities, including gesture recognition, and enable the system to sense user operations and intent.

In various embodiments, the accelerometer can be a 3-axis accelerometer having data rates of at least 50 Hz. A gyroscope can also be included, which can be a 3-axis gyroscope. In addition, an e-compass/magnetometer can be present. Also, one or more proximity sensors can be provided (e.g., for lid open to sense when a person is in proximity (or not) to the system and adjust power/performance to extend battery life). For some OS's Sensor Fusion capability including the accelerometer, gyroscope, and compass can provide enhanced features. In addition, via a sensor hub having a real-time clock (RTC), a wake from sensors mechanism can be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS can be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can supports three power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 8, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 can also couple to EC 835 via a PS2 interface. In addition, a security processor such as a trusted platform module (TPM) 838 in accordance with the Trusted Computing Group (TCG) TPM Specification Version 1.2, dated Oct. 2, 2003, can also couple to processor 810 via this LPC interconnect. However, understand the scope of the present disclosure is not limited in this regard and secure processing and storage of secure information can be in another protected location such as a static random access memory (SRAM) in a security coprocessor, or as encrypted data blobs that are only decrypted when protected by a secure enclave (SE) processor mode.

In a particular implementation, peripheral ports can include a high definition media interface (HDMI™) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports can include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field can be via a near field communication (NFC) unit 845 which can communicate, in one embodiment with processor 810 via an SMBus. Note that via this NFC unit 845, devices in close proximity to each other can communicate. For example, a user can enable system 800 to communicate with another, e.g., portable device such as a smartphone of the user via adapting the two devices together in close relation and enabling transfer of information such as identification information payment information, data such as image data or so forth. Wireless power transfer can also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth® unit 1152 (of Bluetooth Special Interest Group), short range communications via a Bluetooth® protocol can occur. These units may communicate with processor 810 via, e.g., a USB link or a universal asynchronous receiver transmitter (UART) link. Or these units may couple to processor 810 via an interconnect according to a Peripheral Component Interconnect Express® (PCIe®) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which can be configured on one or more add-in cards, can be by way of the Next Generation Form Factor (NGFF) connectors adapted to a motherboard.

In addition, wireless wide area communications, e.g., according to a cellular or other wireless wide area protocol (WWAN), can occur via a WWAN unit 856 which in turn may couple to a subscriber identity module (SIM) 857. In addition, to enable receipt and use of location information, a GPS module 855 can also be present. Note that in the embodiment shown in FIG. 8, WWAN unit 856 and an integrated capture device such as a camera module 854 may communicate via any of a number of protocols. In one embodiment, the camera module 854 communicates via a given USB protocol such as a USB 2.0 or 3.0 link, or a UART or I$^2$C protocol. In another embodiment, the camera modules 854 communicates via a Camera Serial Interface (CSI) such as CSI2. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows® 8 CS. This card can be configured in an internal slot (e.g., via an NGFF adapter). An additional module can provide for Bluetooth capability (e.g., Bluetooth® 4.0 with backwards compatibility) as well as Intel® Wireless Display functionality. In addition NFC support can be provided via a separate device or multi-function device, and can be positioned as an example, in a front right portion of the chassis for easy access. A still additional module can be a WWAN device that can provide support for 3G/4G/LTE and GPS. This module can be implemented in an internal (e.g., NGFF) slot. Integrated antenna support can be provided for WiFi™, Bluetooth®, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1160, which may couple to processor 810 via a high definition audio (HDA) link. Similarly, DSP 860 may communicate with an integrated coder/decoder (CODEC) and amplifier 862 that in turn may couple to output speakers 863 which can be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1110 can be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR can be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 835. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 9:
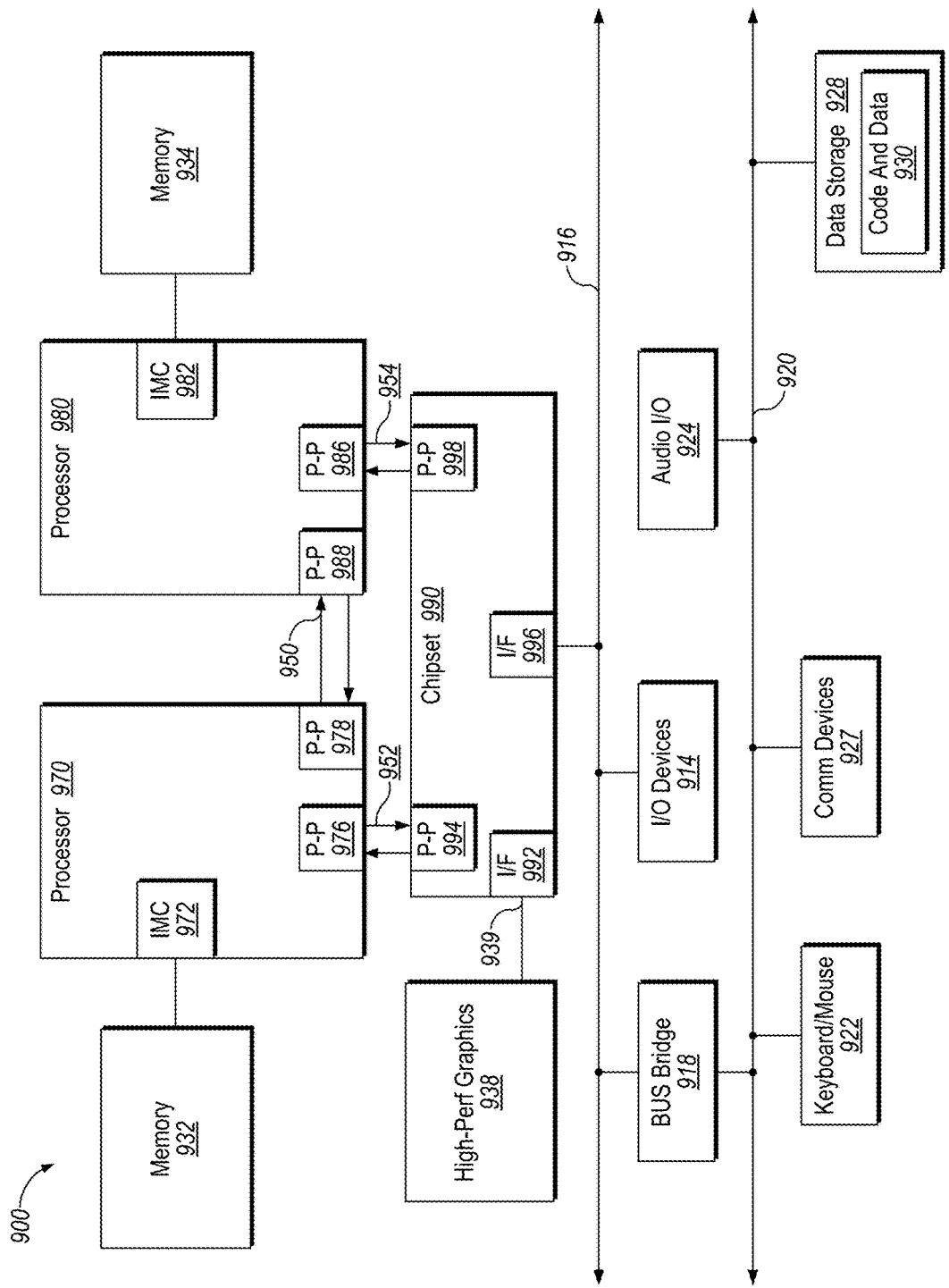
FIG. 9 is a block diagram of a computing system, according to another embodiment of the present disclosure.

Referring now to FIG. 9, shown is a block diagram of a second system 900 in accordance with an embodiment of the present disclosure. As shown in FIG. 9, multiprocessor system 900 is a point-to-point interconnect system, and includes a first processor 970 and a second processor 980 coupled via a point-to-point interconnect 950. Each of processors 970 and 980 can be some version of a processor. In one embodiment, 952 and 954 are part of a serial, point-to-point coherent interconnect fabric, such as Intel's Quick Path Interconnect (QPI) architecture. As a result, the disclosure can be implemented within the QPI architecture.

While shown with only two processors 970, 980, it is to be understood that the scope of the present disclosure is not so limited. In other embodiments, one or more additional processors can be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 can exchange information via a point-to-point (P-P) interface 950 using P-P interface circuits 978, 988. As shown in FIG. 9, IMCs 972 and 982 couple the processors to respective memories, namely a memory 932 and a memory 934, which can be portions of main memory locally attached to the respective processors.

Processors 970, 980 each exchange information with a chipset 990 via individual P-P interfaces 952, 954 using point to point interface circuits 976, 994, 986, 998. Chipset 990 also exchanges information with a high-performance graphics circuit 938 via an interface circuit 992 along a high-performance graphics interconnect 939. In one embodiment, the interface circuit 992 includes ALTC 114, and the high performance graphics circuit 938 includes DPCD 124. Accordingly, the interface circuit 992 can transmit source capability information and/or link training patterns to the high performance graphics circuit 938 as discussed with reference to FIG. 1-4.

A shared cache (not shown) can be included in either processor or outside of both processors; yet connected with the processors via P-P interconnect, such that either or both processors' local cache information can be stored in the shared cache if a processor is placed into a low power mode.

Chipset 990 can be coupled to a first bus 916 via an interface 996. In one embodiment, first bus 916 can be a Peripheral Component Interconnect (PCI) bus, or a bus such as a PCI Express® bus or another third generation I/O interconnect bus, although the scope of the present disclosure is not so limited.

As shown in FIG. 9, various I/O devices 914 are coupled to first bus 916, along with a bus bridge 918 which couples first bus 916 to a second bus 920. In one embodiment, second bus 920 includes a low pin count (LPC) bus. Various devices are coupled to second bus 920 including, for example, a keyboard and/or mouse 922, communication devices 927 and a storage unit 928 such as a disk drive or other mass storage device which often includes instructions/code and data 930, in one embodiment. Further, an audio I/O 924 is shown coupled to second bus 920. Note that other architectures are possible, where the included components and interconnect architectures vary. For example, instead of the point-to-point architecture of FIG. 9, a system can implement a multi-drop bus or other such architecture.

In one embodiment, the interface 996 includes ALTC 114 and any of the connected devices (off of first bus 916 or the second bus 920) includes receiver 122 and/or DPCD 124, according to the present disclosure. Accordingly, the interface circuit 996 can transmit the source capability information and link training information to any of the connected devices as discussed with reference to FIG. 1-4.

The following examples pertain to further embodiments.

Example 1

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A source device comprising:
   a transmitter to transmit source capability information to a sink device, wherein the source capability information is for link training of a link between the source device and the sink device; and
   adaptive link training circuitry coupled to the transmitter, wherein the adaptive link training circuitry is to:
      initiate the link training between the source device and the sink device;
      determine whether the link training between the source device and the sink device is unsuccessful; and
      in response to determining that the link training is unsuccessful, automatically adapt, based on the source capability information, a first lane of the link to a first setting and a second lane of the link to a second setting that is different from the first setting.

2. The source device of claim 1, wherein the source capability information comprises source equalization settings.

3. The source device of claim 1, wherein the source capability information comprises step increases in equalization settings.

4. The source device of claim 1, wherein the source capability information comprises step increases to voltage swing settings.

5. The source device of claim 1, wherein:
   the source device is a graphics processing unit (GPU); and
   the sink device is a timing-controller (Tcon) of a display device.

6. A system comprising:
   a source device coupled to a sink device via a link, wherein the source device comprises:
      a transmitter coupled to transmit source capability information to the sink device, wherein the source capability information is for link training of the link between the source device and the sink device; and
      adaptive link training circuitry coupled to the transmitter, wherein the adaptive link training circuitry is to:
         initiate the link training between the source device and the sink device;
         determine whether the link training between the source device and the sink device is unsuccessful; and
         in response to determining that the link training is unsuccessful, automatically adapt, based on the source capability information, a first lane of the link to a first setting and a second lane of the link to a second setting that is different from the first setting.

7. The system of claim 6, wherein the source capability information comprises source equalization settings.

8. The system of claim 6, wherein the source capability information comprises step increases in equalization settings.

9. The system of claim 6, wherein the source capability information comprises step increases to voltage swing settings.

10. The system of claim 6, wherein the source device further comprises a graphics core that is coupled to the adaptive link training circuitry.

11. The system of claim 6, wherein the source device further comprises a processing core that is coupled to the adaptive link training circuitry.

12. The system of claim 6, wherein:
    the source device is a system-on-chip (SOC); and
    the sink device is a display device.

13. A method comprising:
- transmitting source capability information of a source device to a sink device;
- initiating link training between the source device and the sink device;
- determining whether the link training between the source device and the sink device is unsuccessful; and
- in response to determining that the link training is unsuccessful, automatically adapting, based on the source capability information, a first lane of the link to a first setting and a second lane of the link to a second setting that is different than the first setting.

14. The method of claim 13, wherein the source device is a system-on-chip (SOC).

15. The method of claim 13, wherein the sink device is a display device.

16. The method of claim 13, wherein the source capability information comprises step increases in equalization settings.

17. The method of claim 13, wherein the source capability information comprises step increases to voltage swing settings.

* * * * *